United States Patent Office 3,032,553
Patented May 1, 1962

3,032,553
2-AMINOALKYL-CYCLOALKANONES
Helmut Ueberwasser, Riehen, Switzerland, assignor to Ciba Corporation, a corporation of Delaware
No Drawing. Filed Dec. 13, 1957, Ser. No. 702,541
Claims priority, application Switzerland Dec. 18, 1956
17 Claims. (Cl. 260—243)

This invention relates to 2-($\Delta^{1'}$-cycloalkenyl)-2-aminoalkyl-cycloalkanones and 2-cycloalkyl-2-aminoalkyl-cycloalkanones. More particularly the invention concerns 2-($\Delta^{1'}$-cyclopentenyl)-2-aminoalkyl-cyclopentanones, and 2-cyclopentyl-2-amino alkyl-cyclopentanones, and salts thereof. The cyclic radicals may contain substituents, for example, alkyl groups, such as the methyl group. The amino group of the aminoalkyl radical is, for example, a lower alkylamino, hydroxyalkylamino, or dialkylamino group, for example a hydroxyethylamino group, but is preferably the radical of a cyclic amine, more particularly of morpholine or thiomorpholine, or alternatively e.g. of pyrrolidine, piperidine piperazine, pipecoline or hydrogenated quinoline. The alkylene radical of the aminoalkyl group may have a straight or branched chain, and preferably contains a chain of 2–3 carbon atoms which may be substituted by an alkyl group, particularly the methyl group. Specific embodiments of the invention are 2 - ($\Delta^{1'}$-cyclopentenyl-2-morpholinoalkyl - cyclopentanones, 2 - ($\Delta^{1'}$-cyclopentenyl) - 2 - thiomorpholinoalkylcyclopentanones, 2-cyclopentyl-2-morpholinoalkyl-cyclopentanones and 2-cyclopentyl-2-piperidinoalkyl-cyclopentanones.

The new compounds have an analgesic action. They also have a novel action on central respiratory control and are useful as cough remedies. Especially suitable in this connection are 2-($\Delta^{1'}$-cyclopentenyl)2-($\beta$-morpholinoethyl)-cyclopentanone and 2-($\Delta^{1'}$-cyclopentenyl)-2-($\beta$-thiomorpholinoethyl)-cyclopentanone and salts thereof.

The invention also provides a process for the manufacture of the aforesaid new compounds, wherein a 2-cycloalkylidene-cycloalkanone is reacted with a reactive ester of an alcohol, which contains an amino group or a substituent convertible into an amino group, with the use of a condensing agent capable of promoting substitution at a methylene group, and, when the resulting compound contains a substituent convertible into an amino group, the said substituent is so converted, and if desired, the double bond is hydrogenated at any desired stage.

As starting materials there are used more especially 2-cyclopentylidene-cyclopentanones, such as 2-cyclopentylidenecyclopentanone. These compounds may contain as substituents for example, alkyl groups, such as methyl, ethyl or propyl groups. The reactive esters of the alkanols used in the present process are more especially those of strong inorganic or organic acids, and principally of hydrohalic acids but also of alkyl or aryl sulfonic acids, such as paratoluene sulfonic acid. The alkylene radical of the substituted ester used for the reaction may have a straight or branched chain. It contains as an amino group more especially a cycloalkylene-amino group, of which the alkylene chain may be interrupted by a hetero-atom, such as oxygen, sulfur or nitrogen. Substituents convertible into amino groups are, for example, halogen atoms, free or substituted hydroxyl groups or nitrile groups.

The reaction is advantageously carried out in the presence of an inert solvent. As condensing agents there may be mentioned alkali metals and alkaline earth metals, such as sodium, potassium, lithium or calcium, or amides, hydrides, hydrocarbon componnds, hydroxides or alcoholates of these metals, for example, sodamide, sodium hydride, lithium-butyl, lithium-phenyl, potassium tertiary butylate or potassium tertiary amylate, or strong organic quaternary bases, such as trimethyl-benzyl-ammonium hydroxide, or a mixture of two or more of these substances.

When the compound obtained by the reaction contains a substituent convertible into an amino group, such substituent is subsequently converted into an amino group. Thus, a hydroxyl group may first be exchanged for a halogen atom and then the resulting halogen-compound may be treated with ammonia or an amine. From nitriles the corresponding amines can be obtained by reduction and, if required, by subsequent substitution at the nitrogen atom.

As hydrogenating agents there may be used those which are known for saturating aliphatic double bonds. Thus, for example, the hydrogenation may be carried out with hydrogen in the presence of a noble metal catalyst, especially palladium.

Depending on the procedure used the products are obtained in the form of their bases or salts. From the free bases salts can be obtained, such as those of hydrohalic acids, nitric acid, sulfuric acid, phosphoric acid, thiocyanic acid, acetic acid, propionic acid, malic acid, oxalic acid, maleic acid, citric acid, benzoic acid, toluylic acids, salicyclic acid, para-aminosalicyclic acid, methane sulfonic acid, ethane sulfonic acid, hydroxyethane sulfonic acid, benzene sulfonic acid or toluene sulfonic acid.

It is known that 1-aminoalkyl-2-cycloalkylidene-cycloalkanols can be obtained by reacting aminoalkylhalides with metals and then with cycloalkylidene-cycloalkanones. In contradistinction thereto in the process of the present invention the introduction of the aminoalkyl group into the 2-position is accompanied by the transposition of the semicyclic double bond into the oxo-free ring. This unexpected course of reaction is illustrated by the following formulae:

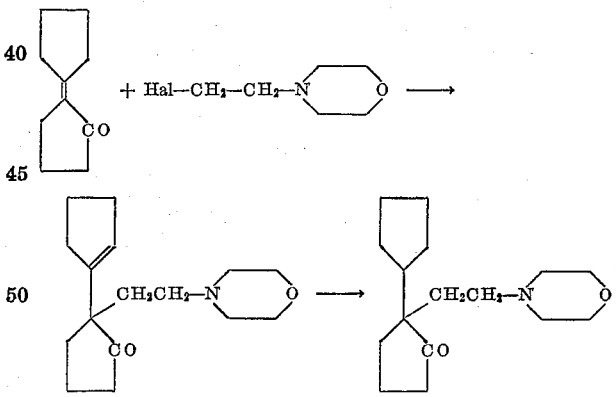

It has been found that the reaction starting from the cyclopentylidene-cyclopentanones gives especially good yields, whereas in the case of the corresponding cyclohexylidene-cyclohexanones mainly other products are formed as for example the basic enol ether of the formula

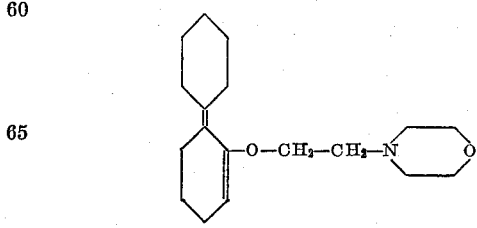

The invention also comprises modifications of the process as above described, in which there is used as starting material a substance obtained as intermediate product at any stage of the complete process with completion of all or part of the remaining stages of the said process.

The new compounds can be used as medicaments, for example, in the form of pharmaceutical preparations which contain them in admixture with a therapeutically useful pharmaceutical organic or inorganic solid or liquid carrier material suitable for enteral or parenteral application. For the production of these preparations such substances are concerned as do not react with the new compounds, as for example water, gelatine, lactose, starch, magnesium stearate, talc, vegetable oils, benzyl alcohols, gums, polyalkylene glycols, or other known medicament carriers. The pharmaceutical preparations can take the form of, for example, tablets or dragees, or are in liquid form as solutions, suspensions or emulsions. They are sterilized if desired, and/or may contain auxiliary substances such as preservative, stabilizing, wetting or emulsifying agents, salts which vary the osmotic pressure, or buffer substances. They may also contain other therapeutically valuable substances. The pharmaceutical preparations are formulated by the usual methods.

The following examples illustrate the invention, the parts being by weight unless otherwise stated, and the relationship of parts by weight to parts by volume being the same as that of the gram to the cubic centimeter:

Example 1

30 parts of commercial sodamide in a finely ground form are slowly added to a stirred solution of 94 parts of 2-cyclopentylidene-cyclopentanone and 94 parts by volume of N-(β-chlorethyl)-morpholine in 200 parts by volume of toluene, the temperature of the reaction mixture being advantageously maintained below 60° C. by external cooling. Ammonia is evolved and sodium chloride precipitates. When the spontaneous reaction has subsided the mixture is stirred for a further 2 hours at 90–100° C. After cooling the reaction mixture water is cautiously added thereto in order to dissolve the inorganic constituents, the aqueous layer is separated from the organic layer, and the basic constituents are extracted from the organic layer by agitation with dilute hydrochloric acid. The hydrochloric acid solution is heated for a short time at 90° C. in order to eliminate a small amount of the basic enol-ether formed as by-product, and after cooling the solution the neutral products are extracted with ether. By rendering the hydrochloric acid solution alkaline with caustic soda solution and by distillation of the organic bases there is obtained 2-(Δ₁'-cyclopentenyl)-2-(β-morpholino-ethyl)-cyclopentanone of the formula

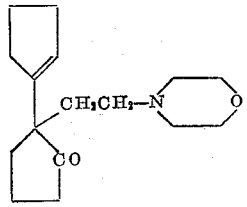

which boils at 112° C. in a vacuum of 0.035 mm. Its hydrochloride melts at 309° C., its iodated methylate at 106° C.

By using, instead of the cyclopentylidene-cyclopentanone, the 3-methylcyclopentylidene-4'-methylcyclopentanone obtainable from 3-methyl-cyclopentanone by condensation with itself at 60–120° C. in the presence of potassium hydroxide, there is obtained in the described manner the 2-(3'-methyl-Δ₁'-cyclopentenyl)-2-(β-morpholino-ethyl)-4-methyl-cyclopentanone of boiling point 117° C. (under a pressure of 0.1 mm.).

By using, instead of the cyclopentylidene-cyclopentanone, the 2,5-bis-cyclopentylidene-cyclopentanone obtainable from that compound by further condensation with cyclopentanone, there is obtained in the manner described the 2-cyclopentenyl-5-cyclopentylidene-2-(β-morpholino-ethyl)-cyclopentanone of the formula

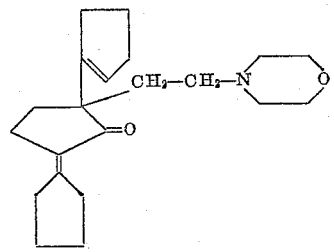

in the form of a pale yellow oil of boiling point 165° C. (under 0.05 mm. pressure); its hydrochloride forms pale yellow crystals which melt at 243° C.

When the product is hydrogenated, e.g. in the presence of a palladium charcoal catalyst, there is obtained, when one mol of hydrogen is combined, the 2-cyclopentenyl-5-cyclopentyl-2-(β-morpholinoethyl)-cyclopentanone hydrochloride in the form of colorless crystals melting at 232° C.

Example 2

40 parts of 2-(Δ₁'-cyclopentenyl)-2-(β-morpholino-ethyl)-cyclopentanone hydrochloride obtained according to Example 1 in 150 parts by volume of water and 300 parts by volume of glacial acetic acid are agitated under hydrogen at atmospheric pressure at a temperature of 20–40° C. in the presence of 5 parts of palladium carbon (palladium content=5%). When about 3000 parts by volume of hydrogen gas have been absorbed the hydrogenation ceases. After removing the catalyst the solution is evaporated to dryness in vacuo, whereby 2-cyclopentyl-2-(β-morpholinoethyl)-cyclopentanone hydrochloride is obtained in a well crystallized form. After recrystallization from alcohol the compound melts at 190° C. and has the formula

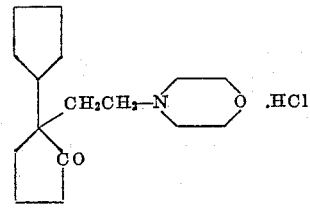

Example 3

31 parts of 2-cyclopentylidene-cyclopentanone and 31 parts by volume of N-(β-chlorethyl)-piperidine are dissolved in 100 parts by volume of toluene and 10 parts of commercial finely ground sodamide are added while stirring. The temperature is maintained below 75° C. by cooling until the evolution of ammonia gas slackens. The whole is then heated for a short time longer at 90° C. When the evolution of ammonia ceases, the mixture is cooled and worked up as described in Example 7. There in obtained 2-(Δ₁'cyclopentenyl)-2-(β-piperidinoethyl)-cyclopentanone, which boils at 103° C. under a pressure of 0.025 mm. of mercury and its hydrochloride melts at 229° C. and has the formula

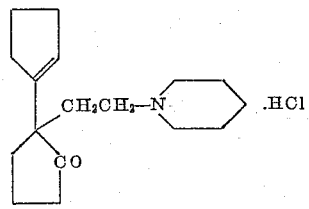

By reacting, instead of the N-(β-chlorethyl)-piperidine, 27 parts by volume of N-(β-chlorethyl)-pyrrolidine under the same conditions with 2-(Δ₁'-cyclopentylidene)-cyclopentanone, there is obtained 2-(Δ₁'-cyclopentyl)-2-(β-pyrrolidino-ethyl)-cyclopentanone boiling at 111° C. under 0.16 mm. pressure. Its hydrochloride melts at 181° C.

There can be prepared in the same manner: 2-(Δ₁'-cyclopentenyl) - 2 - (β - diethylamino-ethyl) - cyclopentanone of boiling point 88–90° C. (under 0.04 mm. pressure); its hydrochloride melts at 122° C.; 2-(Δ₁'-cyclopentenyl)-2-(γ-piperidino-propyl)-cyclopentanone of boiling point 118–120° C. (under 0.06 mm. pressure); its hydrochloride melts at 179° C.; 2-(Δ₁'-cyclopentenyl)-2-(β-cyclohexamethyleneimino-ethyl) - cyclopentanone of boiling point 123° C. (under 0.1 mm. pressure); 2-(Δ₁'-cyclopentenyl) - 2 - (β - tetrahydro-isoquinolino-ethyl)-cyclopentanone of boiling point 168° C. (under 0.18 mm. pressure); 2 - (Δ₁' - cyclopentenyl) -2-(β-thiormorpholino-ethyl)-cyclopentanone of boiling point 143° C. (under 0.08 mm. pressure); its hydrochloride melts at 241° C.; 2-(Δ₁'-cyclopentenyl)-2-(β - γ' - pipecolino-ethyl)-cyclopentanone of boiling point 117° C. (under 0.07 mm. pressure); 2 - (Δ₁' - cyclopentenyl)-2-(β-α'-pipecolino-ethyl)-cyclopentanone of boiling point 122° C. (0.08 mm. pressure).

When, in this example, the β-chloroethyl-piperidine is replaced by β-chloro-propyl-piperidine, there is obtained a mixture, distilling between 98 and 103° C. under a pressure of 0.02 mm., of 2-(Δ₁'-cyclopentenyl)-2-(2''-piperidino-propyl)-cyclopentanone and the isomeric 2-(Δ₁'-cyclopentenyl)-2-(2''-piperidino-1''-methyl-ethyl) - cyclopentanone. By neutralizing the mixture of bases with dilute hydrochloric acid and adding aqueous sodium perchlorate solution there is obtained a unitary perchlorate of melting point 174° C. The base liberated therefrom by means of caustic soda solution yields, when neutralized with hydrochloric acid and on concentration of the neutral solution, a hydrochloride melting at 193° C.

*Example 4*

6 parts of 2-(Δ₁'-cyclopentenyl)-2-(β-piperidino-ethyl)-cyclopentanone-hydrochloride obtained as described in Example 3 are dissolved in 20 parts by volume of water and 40 parts by volume of glacial acetic acid, and, after the addition of 1 part by weight of palladium carbon, are agitated in an atmosphere of hydrogen at 20–40° C. until the absorption of hydrogen ceases. After removing the catalyst there is obtained by evaporating the mixture to dryness the hydrochloride of 2-cyclopentyl-2-(β-piperidino-ethyl)-cyclopentanone of the formula

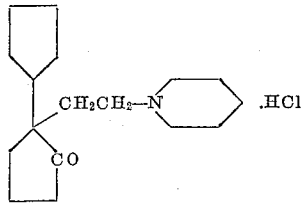

which melts at 229° C.

2-(Δ₁'-cyclopentenyl) - 2 - (β-pyrrolidinoethyl)-cyclopentanone can be hydrogenated in an analogous manner to 2 - cyclopentyl-2-(β-pyrrolidinoethyl)-cyclopentanone, of which the hydrochloride melts at 177° C. In a similar manner there are obtained: 2-cyclopentyl-2-(β-hexamethyleneimino-ethyl) - cyclopentanone hydrochloride, melting at 202° C., 2-cyclopentyl-2-(β-tetrahydro-isoquinolino-ethyl)-cyclopentanone, melting at 87° C., and 2-(3'-methyl-cyclopentyl) - 2 - (β-morpholino-ethyl)-4-methyl-cyclopentanone, distilling at 126° C. under 0.13 mm. pressure.

*Example 5*

52 parts each of 2-cyclohexylidene-cyclohexanone and N-(β-chlorethyl)-morpholine are dissolved in 150 parts by volume of toluene and 14 parts of finely triturated commercial sodamide are introduced in portions while stirring. The reaction temperature is maintained at 70–75° C. by cooling, until the evolution of ammonia gas slackens and then the mixture is heated for a short time longer at 90–95° C. The product is worked up as described in Example 1. The resulting 2-(Δ₁'-cyclohexenyl)-2-(β-morpholinoethyl)-cyclohexanone boils at 136° C. under a pressure of 0.05 mm. of mercury. Its hydrochloride melts at 210° C. and has the formula

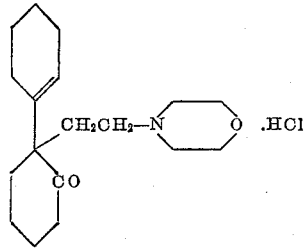

In an analogous manner the following products can be prepared: 2-(Δ₁'-cyclohexenyl) - 2 - (β-piperidino-ethyl)-cyclohexanone which boils at 125° C. under 0.03 mm. pressure, and of which the hydrochloride melts at 201° C.; 2 - (Δ₁'-cyclohexenyl)-2-(β-diethylaminoethyl)-cyclohexanone, which boils at 108° C. under 0.05 mm. pressure and of which the hydrochloride melts at 129° C.; 2-(Δ₁'-cyclohexenyl) - 2 - (γ-piperidino-propyl)-cyclohexanone which boils at 147° C. (under 0.11 mm. pressure).

*Example 6*

6 parts of 2-(Δ₁'-cyclohexenyl)-2-(β-morpholinoethyl)-cyclohexanone hydrochloride obtained as described in Example 5 are dissolved in 20 parts by volume of water and 40 parts by volume of glacial acetic acid, and, after the addition of 1 part of palladium carbon, the whole is agitated under a hydrogen pressure of 135 atmospheres (gauge pressure) at 90–95° C. The hydrogenation ceases when 1 mol of hydrogen has been absorbed. The solution is filtered to remove the catalyst and freed from solvent in vacuo. By crystallization from a mixture of alcohol and ethyl acetate there is obtained 2-cyclohexyl-2 - (β - morpholinoethyl)-cyclohexanone hydrochloride melting at 231° C. and having the formula

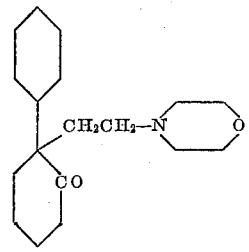

In the same manner the following compounds can be obtained by hydrogenation: 2-cyclohexyl-2-(β-piperidino-ethyl)-cyclohexanone, of which the hydrochloride melts at 235° C., and 2-cyclohexyl-2-(β-diethylaminoethyl)-cyclohexanone of which the hydrochloride melts at 148° C.

*Example 7*

18 parts of 2-cyclopentylidene-cyclopentanone and 16 parts of β-bromethyl-vinyl ether are successively added in portions, while stirring, to a suspension of 5 parts of sodamide (which is first finely triturated under toluene) in 10 parts by volume of toluene and 12 parts by volume of ether, the temperature being maintained at 45° C. by cooling. When the evolution of heat has subsided, stirring is continued for 12 hours at that temperature. The reaction mixture is heated to 65° C. for one hour, cooled again and then separated into two layers by carefully adding water and ether. After being dried, the organic layer is subjected to fractional distillation.

2 - (3 - oxa - 4 - pentenyl) - 2 - Δ¹' - cyclopentenyl - cyclopentanone of the formula

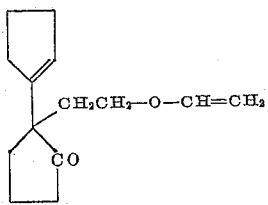

is obtained in the form of a nearly colorless oil which distills at 84° C. under a pressure of 0.17 mm. 8.2 parts of this vinyl ether are heated to 75° C. in 200 parts by volume of 50% alcohol in an atmosphere of nitrogen, 7 parts by volume of concentrated hydrochloric acid are added and the whole maintained at the indicated temperature for 20 minutes. The reaction mass is cooled under nitrogen to 20° C. and neutralized by the addition of 8.5 parts by volume of 10 N-caustic soda solution. The mixture is concentrated under vacuum to half its volume, whereupon the 2-(Δ¹'-cyclopentenyl)-2-(β-hydroxyethyl)-cyclopentanone of the formula

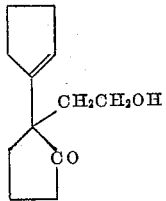

separates as a pale oil which distills at 93° C. under a pressure of 0.08 mm.

5 parts of this bicyclic alcohol, dissolved in 10 parts by volume of pyrridine, are mixed with 4.5 parts by volume of thionyl chloride at −10° C. The mixture is stirred at 22° C. for several hours and then heated to 90° C. for 5 minutes. The reaction mixture is cooled and worked up by adding ice, ether and water. The ether layer is separated and washed with dilute hydrochloric acid and then with water. It is dried and distilled at 82–83° C. under a pressure of 0.09 mm. to obtain the 2-(Δ¹'-cyclopentenyl)-2-(β-chlorethyl)-cyclopentanone of the formula

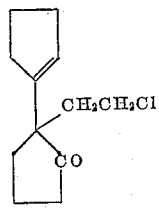

as a nearly colorless oil.

When this bicyclic chloride is dissolved in five times its quantity of morpholine and refluxed for 30 minutes, and the excess morpholine expelled in vacuo, there is obtained by dissolving the residue in dilute hydrochloric acid, extracting the acid solution by shaking it with ether, rendering it alkaline with caustic soda solution and taking up the basic oil which separates in ether, and distillation under a pressure of 0.05 mm. at 114° C., the 2 - (Δ¹' - cyclopentenyl) - 2- (β - morpholino - ethyl)-cyclopentanone described in Example 1, the hydrochloride of which crystallizes from dilute alcohol with 1 mol water of crystallization and melts at 209° C.

When in this reaction the morpholine is replaced by n-butylamine and the reaction mass is refluxed for 1 hour, there is obtained by the afore-described method of working up the 2-(Δ¹'-cyclopentenyl)-2-(β-butylaminoethyl)-cyclopentanone in the form of a slightly yellowish oil which boils at 74° C. under a pressure of 0.07 mm. Its hydrochloride melts at 132° C. By hydrogenating the latter, dissolved in 10 parts by volume of 50% alcohol and in the presence of 0.3 part of 10% palladium charcoal as catalyst, filtering the solution to remove the catalyst and concentrating the filtrate, there is obtained the 2-cyclopentyl-2-(β-butylamino-ethyl)-cyclopentanone hydrochloride of melting point 163–164° C.

*Example 8*

74 parts by volume of 2-cyclopentylidene-cyclopentanone are added, while stirring, to a dispersion of 12.5 parts of sodium hydride in 120 parts by volume of absolute dioxane. The formation of the organic sodium compound which is slow at first is accelerated by heating the reaction mass to 45° C. The reaction temperature must subsequently be maintained at 42–47° C. by cooling. When the spontaneous evolution of hydrogen subsides, the reaction mass is cooled to 20° C., and 95 parts by volume of β-chlorethyl bromide are added all at once after which the evolution of hydrogen becomes brisk again. The temperature should be maintained at 40–45° C. Along with the hydrogen there may escape vinyl chloride which is formed when the reaction proceeds too rapidly. By the gradual addition of a further 200 parts by volume of absolute dioxane the reaction mixture is kept stirrable. When the reaction is complete the mixture is heated slowly to 100° C. and maintained at that temperature for 30 minutes. On cooling to 15° C. salts separate which are dissolved by the addition of 100 parts by volume of water. On dilution of the reaction mixture with ether, two layers are formed which can be separated easily. The organic layer is dried and fractionally distilled to obtain the 2-(Δ¹'-cyclopentenyl)-2-(β-chlorethyl)-cyclopentanone described in Example 7.

1 part of 2-(Δ¹'-cyclopentenyl)-2-(β-chlorethyl)-cyclopentanone is in twice its quantity of ethanolamine is heated for 2 hours, while being thoroughly whirled, on a heating bath of 140° C., under a current of nitrogen. After that, the 2-layer reaction mixture is concentrated under reduced pressure. The residue is dissolved in dilute hydrochloric acid, briefly heated to 80° C., the cooled acid solution rendered alkaline with solid potassium carbonate with the addition of some ether, the ethereal solution dried with potassium carbonate and distilled at 79–82° C. under a pressure of 0.1 mm. to obtain the 2 - (Δ¹'-cyclopentenyl)-2-[β-(β'-hydroxyethylamino)-ethyl]-cyclopentanone as a nearly water-clear oil. The hydrochloride of this base is obtained by dissolving 61 parts of the bicyclic ethanolamine in the threefold quantity of alcohol, adding 41 parts by volume of 6.25 N-hydrochloric acid (the pH adjusting itself to 6.5), completely concentrating the whole under reduced pressure at a bath temperature of 35° C., dissolving the substance in 10 parts by volume of alcohol, and adding ethyl acetate until the solution begins to become turbid. The colorless crystals so obtained melt at 168–169° C.

In an analogous manner, with the use of diethanolamine or N-butyl-ethanolamine in lieu of the primary ethanolamine, there can be prepared 2-(Δ¹'-cyclopentenyl) - 2 - [β - (di - β' - hydroxyethylamino) - ethyl] - cyclopentanone of boiling point 175–177° C. (0.1 mm.), the hydrochloride of which melts at 105–106° C.; 2-(Δ¹'-cyclopentenyl) - 2 - [β - (N - butyl - N - β' - hydroxyethylamino)-ethyl]-cyclopentanone of boiling point 140° C. (under a pressure of 0.16 mm.).

By hydrogenating the hydrochlorides of these compounds in alcoholic solution with the addition of 0.2 part of palladium charcoal as catalyst in each case there can be obtained: 2-cyclopentyl-2-[β-(β'-hydroxyethylamino)-ethyl]-cyclopentanone-hydrochloride of melting point 103–104° C.; 2-cyclopentyl-2-[β-(di-β'-hydroxyethylamino)-ethyl]-cyclopentanone-hydrochloride of melting point 137–138° C.; 2-cyclopentyl-2-[β-(N-butyl-N-β'-hydroxyethylamino)-ethyl]-cyclopentanone of boiling point 136° C. (0.06 mm.).

*Example 9*

To a stirred suspension of 12 parts of fine-grained sodium hydride in 120 parts by volume of absolute dioxane are added as one portion 74 parts of 2-cyclopentylidene-cyclopentanone. The reaction is caused to set in by heating for a very short time and the reaction mass then maintained at 42–47° C. by external cooling. When the spontaneous evolution of hydrogen has ceased, stirring is continued for another 2 hours at this temperature with external heating. The reaction mass is then cooled to 10° C. and 110 parts of ethylene chlorohydrin-benzene sulfonic acid ester are added as one portion (the latter being purified first by washing in toluene solution with water, drying with sodium sulfate or by azeotropic removal of the water with the toluene which distilled off). The reaction mixture is stirred for 14 hours, its temperature being maintained at 44° to 47° C., first by cooling, then by gradually increased heating, and kept stirrable by the gradual addition of 210 parts by volume of absolute dioxane. It is then cooled to 15° C. and easily separable layers obtained by the addition of 150 parts by volume of water and 50 parts by volume of ether. The organic layer, after being washed with sodium chloride solution, dried with sodium sulfate and distilled, yields the 2-($\Delta^{1'}$ - cyclopentenyl) - 2 - ($\beta$ - chlorethyl) - cyclopentanone described in Examples 7 and 8. When this product is heated with ten times its quantity of piperazine for 40 minutes on a bath of 140° C. and the excess piperazine is removed under reduced pressure, the residue taken up in dilute hydrochloric acid and the hydrochloric acid solution heated for a short time to 80° C., cooled, mixed with some ether, and rendered alkaline with solid potassium carbonate the ethereal solution dried with potassium carbonate and distilled at 124–125° C. under a pressure of 0.05 mm., there is obtained the 2-($\Delta^{1'}$-cyclopentenyl)-2-($\beta$-piperazino-ethyl)-cyclopentanone of the formula

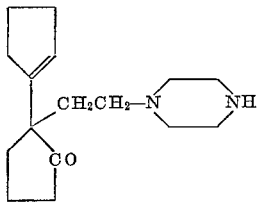

in the form of a slightly yellowish, thinly liquid oil which after being neutralized with hydrochloric acid forms a dihydrochloride which crystallizes from its alcoholic solution. The dihydrochloride discolors before it melts and decomposes at 280° C.

When in this example the piperazine is replaced by N-monomethyl-piperazine or N-$\beta$-hydroxyethyl-piperazine, there are obtained in the manner described 2-($\Delta^{1'}$-cyclopentenyl - 2 - [$\beta$ - (4″ - methyl - 1″ - piperazino) - ethyl]-cyclopentanone of boiling point 120° C. (under 0.06 mm. pressure); the dihydrochloride melts at 286° C. (after becoming colored); 2-($\Delta^{1'}$-cyclopentenyl)-2-[$\beta$-(4″ - hydroxyethyl - 1″ - piperazino) - ethyl] - cyclopentanone; viscous oil of boiling point 174° C. (0.06 mm.), the dihydrochloride melts and decomposes at 278° C.

In aqueous solution in the presence of 0.1–0.2 part of palladium charcoal as catalyst, the afore-described salts can be hydrogenated to form: 2-cyclopentyl-2-($\beta$-piperazino-ethyl)-cyclopentanone-dihydrochloride (from alcohol), melting point 252–254° C. (with decomposition); 2 - cyclopentyl - 2 - [$\beta$ - (4″ - methyl - 1″ - piperazino) - ethyl]-cyclopentanone-dihydrochloride (from alcohol), melting and decomposing at 273–275° C.; 2-cyclopentyl-2 - [$\beta$ - (4″ - $\beta$ -hydroxyethyl - 1″ - piperazino) - ethyl] - cyclopentanone-dihydrochloride (from alcohol-ethyl acetate) melting at 259–261° C. (with decomposition).

*Example 10*

*Tablets.*—Each tablet contains:

|  | Mg. |
|---|---|
| 2-($\Delta^{1'}$-cyclopentenyl)-2-($\beta$-morpholinoethyl)-cyclopentanone, anhydrous (Preparation 10611) | 25.0 |
| Lactose | 50.0 |
| Aerosil compositum | 15.0 |
| Wheat starch | 80.0 |
| Arrowroot | 20.0 |
| Magnesium stearate | 0.5 |
| Talc | 9.5 |
|  | 200.0 |

*Preparation.*—Preparation 10611 is mixed with lactose and ground in a ball mill for about 8 hours. Aerosil compositum is made up to a paste-like mass with dilute ethanol (70% strength by volume). The powder mixture is then worked into the Aerosil paste in a mixing and kneading machine, and wheat starch added in portions. The homogeneously moist and slightly plastic mass is granulated through an about 3 mm. mesh sieve, dried at 50° C. and passed through an about 15 mm. mesh sieve. The other ingredients are then added and the granulate tableted in the usual manner to obtain tablets of an average weight of 200 mg.

*Example 11*

*Solution for injections.*—Each ampoul contains:

|  | Mg. |
|---|---|
| Preparation 10611 | 20.0 |
| Sodium chloride | 13.2 |
| Water suitable for injections up to 2 ml. | |

*Preparation.*—Preparation 10611 and sodium chloride are dissolved in water suitable for injections in such proportion that 1 ml. contains 10 mg. of Preparation 10611. The solution is filtered in the usual manner, filled into ampouls of 2 ml., capacity which are then sealed. The sealed ampouls are sterilized for 30 minutes in steam of 115° C. pH 4.4±0.2.

What is claimed is:
1. 2-($\Delta^{1'}$-cyclopentenyl-1') - 2 - morpholinoalkyl-cyclopentanone.
2. 2-($\Delta^{1'}$-cyclopentenyl-1') - 2 - ($\beta$ - morpholinoethyl)-cyclo-pentanone.
3. 2-($\Delta^{1'}$-cyclopentenyl - 1') - 2 - ($\beta$ - thiomorpholinoethyl)-cyclopentanone.
4. Process according to claim 11, which comprises using 2-cyclopentylidene-cyclopentanone as the starting material.
5. Process according to claim 11, which comprises using morpholino-lower alkyl halide as the starting material.
6. Process according to claim 11, which comprises using morpholino-ethyl halide as the starting material.
7. Process according to claim 11, which comprises contacting 2-cyclopentylidene-cyclopentanone with thiamorpholinoethyl halide.
8. Process according to claim 11, which comprises contacting 2-cyclopentyidene-cyclopentanone with piperidinoethyl halide.
9. A member of the group consisting of 2-cycloalkyl-2-amino-lower alkyl-cycloalkanone, in which each of the cycloalkyl and cycloalkanone nuclei has from 5 to 6 carbon atoms as ring members, and in which amino stands for a member of the group consisting of unsubstituted amino, lower alkyl-amino, hydroxy-lower alkyl-amino, di-lower alkyl-amino, morpholino, thiamorpholino, pyrrolidino, piperidino, piperazino, pipecolino and hydrogenated quinolino, and therapeutically useful acid addition salts thereof.
10. 2-($\Delta^{1'}$-cycloalkenyl-1') - 2 - hydroxy - lower alkyl amino-lower-alkyl-cycloalkanones in which each cyclic nucleus has from 5 to 6 ring members.
11. Process for the preparation of 2-($\Delta^{1'}$-cycloalkenyl-

1')-2-X-lower alkyl-cycloalkanone, in which each of the cycloalkenyl and cycloalkanone nuclei has from 5 to 6 carbon atoms as ring members, and X stands for a member selected from the group consisting of N,N-di-lower alkyl-amino, morpholino, thiamorpholino, pyrrolidino, piperidino, piperazino, pipecolino, hydrogenated quinolino, halogeno and vinyloxy, which comprises contacting the 2-cycloalkylidene-cycloalkanone, in which each of the cycloalkylidene and the cycloalkanone nuclei has from 5 to 6 carbon atoms as ring members, with a member selected from the group consisting of di-lower alkyl-amino-lower alkyl halide, morpholino-lower alkyl halide, thiamorpholino-lower alkyl halide, pyrrolidino-lower alkyl halide, piperidino-lower alkyl halide, piperazino-lower alkyl halide, pipecolino-lower alkyl halide, hydrogenated quinolino-lower alkyl halide, halogeno-lower alkyl halide and vinyloxy-lower alkyl halide, in the presence of a basic, salt-forming, condensing agent.

12. Process according to claim 11, which comprises treating the resulting 2-($\Delta^{1'}$-cycloalkenyl-1')-2-halogeno-lower alkyl-cycloalkanone with a member of the group consisting of ammonia, lower alkyl-amine, hydroxy-lower alkyl-amine, di-lower alkyl-amine, morpholine, thiamorpholine, pyrrolidine, piperidine, piperazine, pipecoline and hydrogenated quinoline.

13. Process according to claim 11, which comprises reducing in the resulting 2-($\Delta^{1'}$-cycloalkenyl-1')-cycloalkanone the double bond of the cycloalkenyl nucleus by treatment with hydrogen in the presence of a noble metal catalyst.

14. Process according to claim 11, which comprises hydrolyzing the resulting 2-($\Delta^{1'}$-cycloalkenyl-1')-2-(vinyloxy-lower alkyl-cycloalkanone with hydrohalic acid, treating the resulting 2-($\Delta^{1'}$-cycloalkenyl-1')-2-hydroxy-lower alkyl-cycloalkanone with inorganic acid halide and reacting the resulting 2-($\Delta^{1'}$-cycloalkenyl - 1') - 2 - halogeno-lower alkyl-cycloalkanone with a member of the group consisting of ammonia, lower alkyl-amine, di-lower alkyl-amine, morpholine, thiamorpholine, pyrrolidine, piperidine, piperazine, pipercoline and hydrogenated quinoline.

15. Process according to claim 11, which comprises using chloro-lower alkyl bromide as the starting material and reacting the resulting 2-($\Delta^{1'}$ - cycloalkenyl - 1') - 2-chloro-lower alkyl-cycloalkanone with a member of the group consisting of ammonia, lower alkyl-amine, hydroxy-lower alkyl-amine, di-lower alkyl-amine, morpholine, thiamorpholine, pyrrolidine, piperidine, piperazine, pipecoline and hydrogenated quinoline.

16. Process according to claim 15, which comprises reacting the resulting 2-($\Delta^{1'}$-cycloalkenyl-1') - 2 - chloro-lower alkyl-cycloalkanone with hydroxy-lower alkyl-amine.

17. A member of the group consisting of 2-($\Delta^{1'}$-cycloalkenyl-1')-2-amino-lower alkyl-cycloalkanone, in which each of the cycloalkenyl and cycloalkanone nuclei has from 5 to 6 carbon atoms as ring members, and in which amino stands for a member of the group consisting of unsubstituted amino, lower alkyl-amino, hydroxy-lower alkyl-amino, di-lower alkyl-amino, morpholino, thiamorpholino, pyrrolidino, piperidino, piperazino, pipecolino and hydrogenated quinolino, and therapeutically useful acid addition salts thereof.

References Cited in the file of this patent

UNITED STATES PATENTS

| | | |
|---|---|---|
| 2,541,714 | Niederl | Feb. 13, 1951 |
| 2,562,145 | Harman | July 24, 1951 |
| 2,614,961 | Dickey | Oct. 21, 1952 |
| 2,676,881 | Bennett | Apr. 7, 1954 |
| 2,731,498 | Walter | Jan. 17, 1956 |
| 2,779,791 | Radde | Jan. 29, 1957 |
| 2,795,616 | Churchill | June 11, 1957 |

FOREIGN PATENTS

| | | |
|---|---|---|
| 740,130 | Great Britain | Nov. 9, 1955 |
| 857,960 | Germany | Dec. 4, 1952 |

OTHER REFERENCES

Winternitz: Bull. Soc. Chem. (France) (1952), pages 471–6.

UNITED STATES PATENT OFFICE
CERTIFICATE OF CORRECTION

Patent No. 3,032,553                                  May 1, 1962

Helmut Ueberwasser

It is hereby certified that error appears in the above numbered patent requiring correction and that the said Letters Patent should read as corrected below.

Column 3, line 62, for "309° C." read -- 209° C. --; column 4, line 57, for "Example 7" read -- Example 1 --; column 5, line 14, for "2-($\Delta_1'$-cyclopentenyl)" read -- 2-($\Delta_1^{1'}$-cyclopentenyl) --; column 9, line 62, for "(4"-hydroxyethyl" read -- (4"-$\beta$-hydroxyethyl --.

Signed and sealed this 25th day of June 1963.

(SEAL)
Attest:

ERNEST W. SWIDER                                                    DAVID L. LADD
Attesting Officer                                                     Commissioner of Patents